United States Patent [19]

Torre et al.

[11] Patent Number: 4,706,261

[45] Date of Patent: Nov. 10, 1987

[54] DIFFERENTIAL PHASE MODULATION

[75] Inventors: Frank M. Torre, Smithtown; John F. Crush, Levittown; Raymond J. Masak, Northport, all of N.Y.

[73] Assignee: Hazeltine Corporation, Greenlawn, N.Y.

[21] Appl. No.: 714,157

[22] Filed: Mar. 20, 1985

Related U.S. Application Data

[63] Continuation-in-part of Ser. No. 407,982, Aug. 13, 1982, abandoned.

[51] Int. Cl.⁴ .............................................. H04L 27/18
[52] U.S. Cl. ........................................ 375/27; 375/56; 375/67; 375/84; 375/85; 329/105; 329/145; 332/10
[58] Field of Search .................. 375/17, 27, 52, 56, 375/67, 84, 85; 329/104, 105, 110, 145; 332/9 R, 10, 11 R, 16 R, 23 R; 370/12

[56] References Cited

U.S. PATENT DOCUMENTS

| | | | |
|---|---|---|---|
| 2,681,385 | 6/1954 | Oliver | 375/27 |
| 2,732,424 | 1/1956 | Oliver | 375/27 |
| 3,378,641 | 4/1968 | Varsos et al. | 375/27 |
| 3,502,986 | 3/1970 | Lucky | 375/27 |
| 3,603,945 | 9/1971 | Hertich | 360/43 |
| 3,804,985 | 4/1974 | Matsuo | 375/56 |
| 4,020,461 | 4/1977 | Adams | 375/85 |
| 4,174,505 | 11/1979 | Querry | 375/56 |
| 4,211,996 | 7/1980 | Nakamura | 375/56 |
| 4,320,499 | 3/1982 | Muilwijk et al. | 375/56 |
| 4,481,640 | 11/1984 | Chow et al. | 375/56 |

*Primary Examiner*—Benedict V. Safourek
*Attorney, Agent, or Firm*—E. A. Onders; F. R. Agovino

[57] ABSTRACT

The amplitude of a signal to be modulated on a carrier wave is sampled every T seconds. The sampled amplitudes are converted into phase representative pulses of pulse rate 1/T. Each phase representative pulse corresponds to the difference between a first phase corresponding to the sampled amplitude and the phase of Nth previous phase representative pulse, where N is an interger greater than 1. The discrete phase representative pulses are phase modulated onto the carrier wave. Conversion is accomplished by detecting the sampled amplitudes, applying the detected amplitudes as an address to a ROM to provide corresponding differential phase information, and modulating the differential phase information onto the carrier. To demodulate the signal from the carrier wave, the carrier wave is delayed for NT seconds and the delayed signals are subtracted from the undelayed signals. The resulting signal is linearly detected by an envelope detector to develop an output signal representative of the original modulating signal.

21 Claims, 13 Drawing Figures

$$M_n = m(t_n) + 1 = 2\cos\theta_n \Rightarrow \theta_n = \cos^{-1}\frac{M_n}{2}$$

FIG. 4

$N = 1$ $$M_k = |m(t_k) + 1| = 2\cos\frac{\theta_k - \theta_{k-1}}{2};$$
$$\Rightarrow \theta_k = 2\cos^{-1}\left(\frac{M_k}{2}\right) + \theta_{k-1}$$

FIG. 5

$N = 2$ $$M_n = |m(t_n) + 1| = 2\cos\frac{\theta_n - \theta_{n-2}}{2};$$
$$\theta_n = 2\cos^{-1}\left(\frac{M_n}{2}\right) + \theta_{n-2}$$

CONVENTIONAL PHASE ENCODING

FIG. 9A PRIOR ART

DIFFERENTIAL PHASE ENCODING

FIG. 9B

EXTENDED DIFFERENTIAL
PHASE ENCODING

| N = 2 | Via 103d | | | | | | | | |
|---|---|---|---|---|---|---|---|---|---|
| | | 60 | 41 | 51 | 0 | 56 | 76 | 72 | 90 ..... |
| Via 103R | 60 | | | 222 | | | 10 | 98 | |
| | 41 | | | 46 | 82 | | | | |
| | 51 | | 304 | | | | 198 | | |
| | 0 | | | | | 194 | | | |
| | 56 | 314 | | | | | | | |
| | 76 | 290 | | | | | | | 18 |
| | 72 | 218 | | | | | | | |
| | 90 | | | | | 170 | | | |
| | ⋮ | | | | | | | | |

FIG. 11

DIFFERENTIAL PHASE MODULATION

The Government has rights in this invention pursuant to Contract No. F30602-76-C-0219 awarded by the Department of the Air Force.

This is a continuation-in-part of Ser. No. 407,982 filed Aug. 13, 1982, now abandoned.

BACKGROUND OF THE INVENTION

1. Field of the Invention

The invention relates generally to modulation and demodulation methods and apparatus and, in particular, to digital phase modulators and demodulators.

2. Description of the Prior Art

Phase modulation is a type of angle modulation well known in the prior art (e.g. U.S. Pat. No. 3,492,576) and is a process in which the phase of a carrier signal is made to vary linearly in accordance with a signal sampled data phase modulation is a process by which the phase of a pulsed signal is varied in accordance with a sampled data signal.

SUMMARY OF THE INVENTION

It is an object of this invention to provide a modulating/demodulating system which transmits and receives sampled data information which may be linearly detected.

It is another object of this invention to provide a system employing constant envelope modulation with linear demodulation.

It is another object of this invention to provide a system which transmits and/or receives a signal having a noise spectrum shape which is not flat, a signal/noise ratio which is greater than normal AM signals and, as a result, a signal which has improved speech intelligibility.

The invention includes a method of modulating a carrier wave with a signal. The amplitude of the signal is sampled every T seconds where 1 is less than one second. The sampled amplitudes are encoded into phase representative pulses of pulse rate 1/T corresponding to the difference between a first phase corresponding to the sampled amplitudes and the phase of the Nth previous pulse, where N is an integer greater than 1. These phase representative pulses are phase modulated onto a carrier wave which may then be demodulated. The demodulated discrete pulses are delayed for NT seconds and subtracted from the demodulated discrete pulses. The desired signal is linearly detected from the subtracted demodulated pulses.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
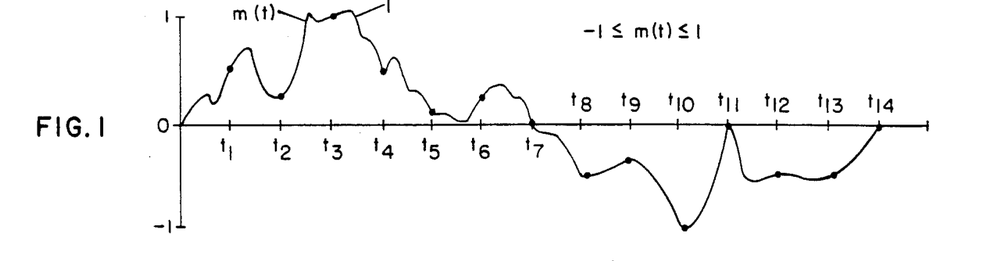
FIG. 1 illustrates audio information which is to be modulated on a carrier.
Figure 2:
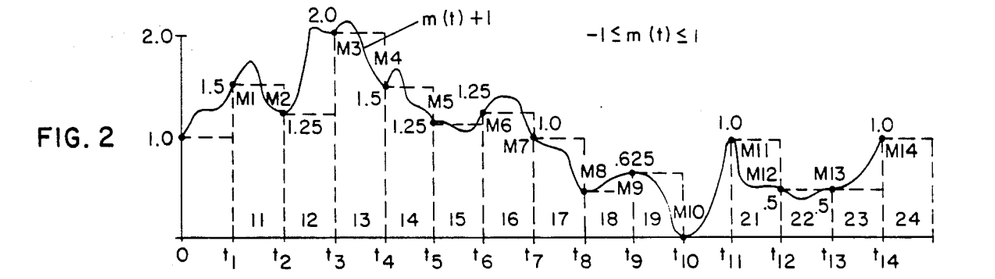
FIG. 2 is a representation of the audio information in FIG. 1 up-shifted in amplitude and discretely sampled every T seconds.

Audio information m(t) such as the information represented by line 1 of FIG. 1 may be modulated on a carrier in the following manner. The amplitude of the audio information is sampled every T seconds so that, for example, at $t_1$ it is found that the amplitude is 0.5, at $t_2$ the amplitude is 0.25, at $t_3$ the amplitude is 1.0 ..., at $t_8$ the amplitude is $-0.5$, at $t_9$ the amplitude is $-0.37$, ... and at $t_{14}$ the amplitude is 0. This audio information may be encoded into a discrete waveform by sampling every T seconds and considering the samples as a series of pulses of pulse rate 1/T wherein the amplitude (or any other parameter) of each pulse corresponds to the sampled amplitude of the audio information. Such a discrete modulation scheme is illustrated in phantom in FIG. 2 wherein audio information m(t) is up-shifted so that pulse 11 at time $t_1$ has an amplitude $M_1 = 1.5$, pulse 12 at time $t_2$ has an amplitude $M_2 = 1.25$, pulse 13 at time $t_3$ has an amplitude $M_3 = 2.0 \ldots$, pulse 18 at time $t_8$ has an amplitude $M_8 = 0.5$, pulse 19 at time $t_9$ has an amplitude $M_9 = 0.25 \ldots$ and pulse 24 at time $t_{14}$ has an amplitude of $M_{14} = 1.0$.

Figure 3:
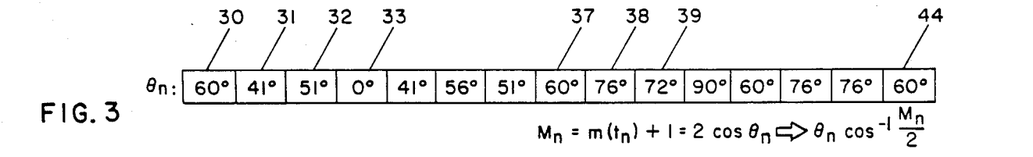
FIG. 3 illustrates phase modulation of the discrete information illustrated in FIG. 2.

The audio information m(t) would then be encoded as a series of pulses represented by FIG. 3 wherein each pulse has a parameter directly proportional to the amplitude of the audio signal. For example, if the parameter of each pulse is the amplitude of the pulse, the phase may be equal to $\theta_n$ by defining $$M_n m(t_n) + 1 = 2 \cos \theta_n \text{ (i.e. } \theta_n = \cos^{-1}(M_n/2))$$

so that at time zero the amplitude of pulse 30 corresponds to 60°, at time $t_1$ the amplitude of pulse 31 corresponds to 41°, at time $t_2$ pulse 32 is 51°, at time $t_3$ pulse 33 is 0°. ..., at time $t_8$ pulse 38 is 76°, at time $t_9$ pulse 39 is 72°, ... and at time $t_{14}$ the amplitude of pulse 44 corresponds to 60°.

Figure 9A:
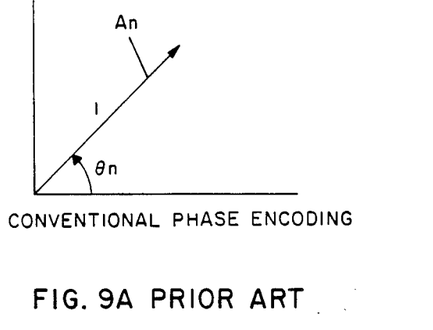
FIG. 9A is a vector diagram illustrating conventional phase modulation.

FIG. 9A is a vectorial diagram illustrating conventional phase encoding. Vector $A_n$ represents a pulse of magnitude one and of phase equal to $\theta_n$. In the phase modulation scheme illustrated in phantom in FIG. 2, phase modulation is generated by comparing the amplitude of each pulse to a reference pulse of zero equivalent potential.

Figure 4:
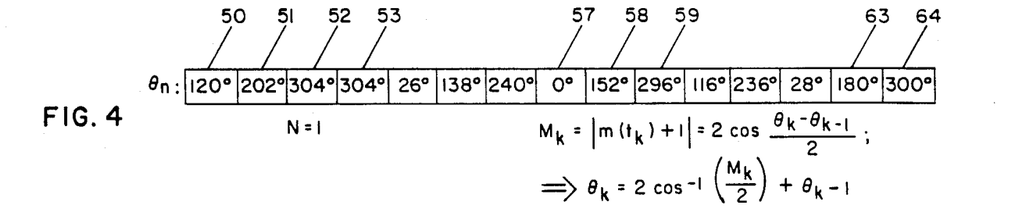
FIG. 4 illustrates differential phase modulation of the information illustrated in FIG. 2 according to the invention.
Figure 5:
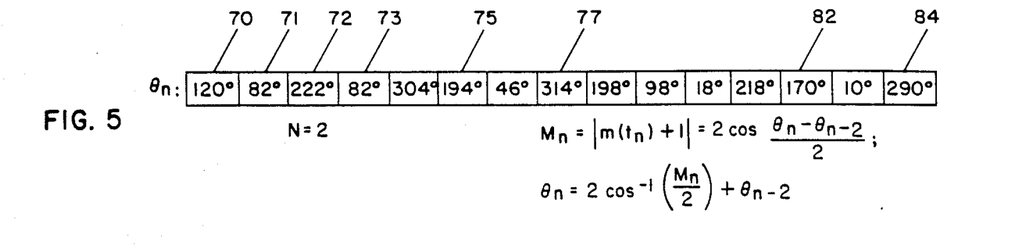
FIG. 5 illustrates extended differential phase modulation of the discrete information illustrated in FIG. 2.

The invention contemplates that the referencing pulse may be changed in order to enhance encoding and detection. FIG. 4 illustrates a phase encoding technique where the previous pulse forms the reference of the encoding of the next pulse. FIG. 5 illustrates a phase encoding technique where the second previous pulse forms the reference for the encoding of the next pulse.

Differential phase encoding according to the invention employs a technique where a previous pulse forms the reference for the encoding of the next pulse. In general, the term differential phase encoding means that the previous pulse is the reference of the encoding of the next pulse and extended differential phase encoding means that the second previous pulse or one previous thereto forms the reference for the encoding of the next pulse. FIG. 4 illustrates differential phase encoding and FIG. 5 illustrates extended differential phase encoding. As shown in the equations accompanying FIG. 4, the phase angle of a given pulse denoted by the $\theta_k$ is equal to $2\cos^{-1}(M_k/2)$ plus the phase of the previous pulse. Therefore, pulse 50 is provided with an amplitude corresponding to 120° which is equal to twice the phase of pulse 30 plus the phase of the previous pulse (which is assumed to have 0° phase). Similarly, pulse 51 is provided with an amplitude corresponding to 202° which is twice 41° (pulse 31) plus 120° (pulse 50), . . . , pulse 53 has an amplitude corresponding to 304° which is twice 0° (pulse 33) plus 304° (pulse 52), . . . , pulse 58 has an amplitude corresponding to 152° which is twice 76° (pulse 38) plus 0° (pulse 57), pulse 59 has an amplitude corresponding to 296° which is twice 72° (pulse 39) plus 152° (pulse 58), . . . , pulse 64 has an amplitude corresponding to 300° which is twice 60° (pulse 44) plus 180° (pulse 63).

FIG. 5 illustrates extended differential phase encoding wherein pulse 72 has an amplitude corresponding to 222° which is twice 51° (the amplitude corresponding to pulse 32) plus the amplitude corresponding to the second previous pulse 70 which is 120°. Similarly, pulse 73 has an amplitude corresponding to 82° which is twice 0° (pulse 33) plus 82° (pulse 71), . . . pulse 77 has an amplitude corresponding to 314° which is twice 60° (of pulse 37) plus 194° (pulse 75), . . . pulse 84 has an amplitude corresponding to 290° which is twice 60° (pulse 44) plus 170° (pulse 82).

Figure 9B:
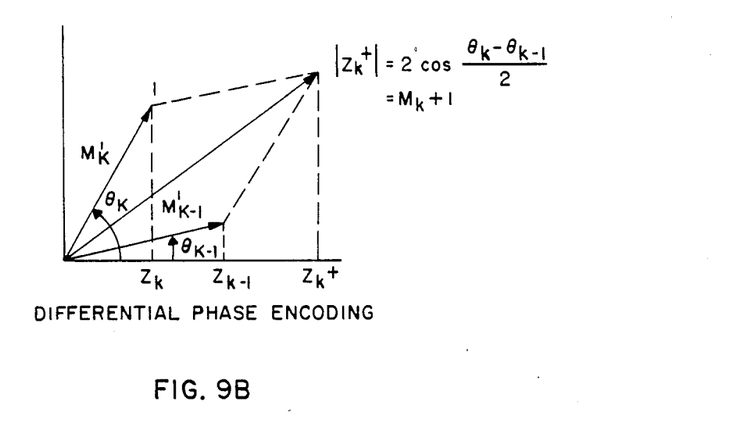
FIG. 9B is a vector diagram illustrating differential phase modulation.
Figure 9C:
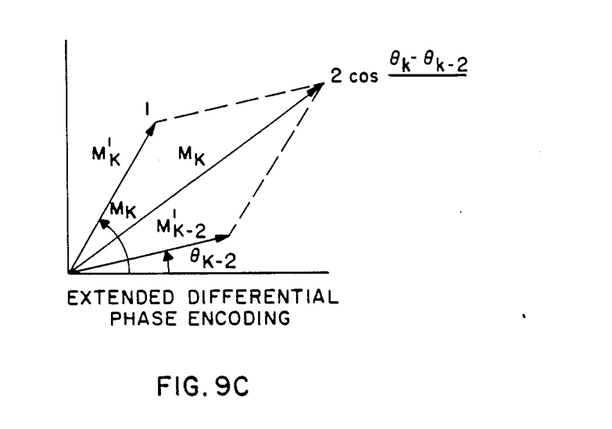
FIG. 9C is a vector diagram illustrating extended differential phase modulation.

FIG. 9B is a vectorial diagram illustrating the differential phase encoding scheme according to the invention. Vector $M_k'$ is a vector of unit magnitude having a phase of $\theta_k$. Vector $M'_{k-1}$ is a vector having unit magnitude with phase $\theta_{k-1}$. The resultant vector which is the combination of vectors $M'_k$ and $M'_{k-1}$ is vector $M_k$ having magnitude $2\cos[(\theta_k - \theta_{k-1})/2]$ and having a phase of $(\theta_k - \theta_{k-1})/2$.

Therefore, vector $M_k$ is considered to be the resultant of two vectors of unit magnitude so that the magnitude of vector $M_k$ is directly, linearly proportional to the phase difference between the vectors $M'_k$ and $M'_{k-1}$. Accordingly, phase encoding of the differential phase angle $\theta_k - \theta_{k-1}$ of vectors $M'_k$ and $M'_{k-1}$ provides information relating the magnitude of resultant vector $M_k$. Linear detection of the differential phase signal results in information directly relating to the amplitude of the corresponding audio signal m(t).

In particular, the rationale underlying this particular mapping between the quantized audio sample values and the carrier phase will be addressed below when the demodulation process is examined. In general, the phase shift for any sample interval is a function of the phase shift for the preceding sample interval. Hence, the modulation is a form of differential phase encoding.

The mapping between audio sample amplitudes and carrier phase shift is a particular nonlinear transformation which results in linear demodulation equivalent to ordinary AM. This is in contrast to ordinary phase modulation as shown in FIG. 3 wherein the mapping is linear resulting in a nonlinear demodulation process.

FIG. 9B is a vector diagram of differential phase encoding wherein the focus is on two successive intervals i.e., the k-1st sample interval and the kth sample interval. To simplify this discussion, the epoch pulse magnitudes are assumed to be unity. Thus, the output at the epoch time $t_k = kT$ for the $k^{th}$ sample interval is given by:

$$Z(t_k) = Z_k \triangleq \cos[2\pi(f+f_d)kT = a_k + b] \quad (1)$$

where f is the intermediate frequency (if), and $f_d$ and b are the frequency and phase uncertainty, respectively, both assumed to be fixed over the successive sample intervals.

Similarly, the output at $t_k - 1 = (k-1)T$ is $$Z_k - 1 = \cos[2\pi(f+f_d)(k-1)T + a_k - 1 = b] \quad (2)$$

Figure 7:
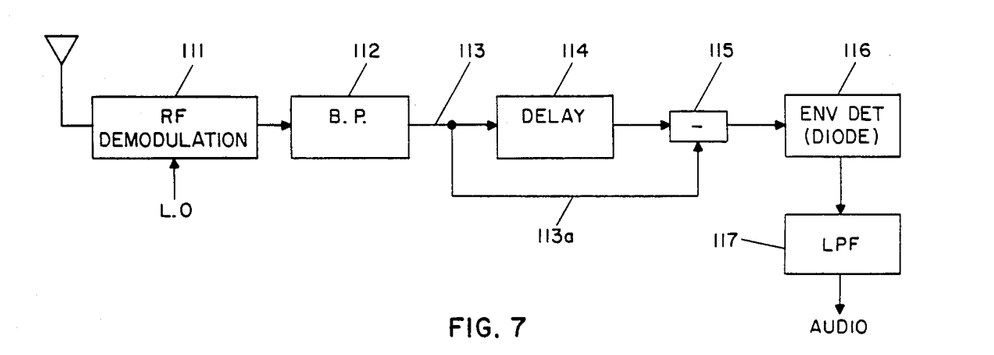
FIG. 7 illustrates a receiver for receiving differential phase modulation signals according to the invention.

The sum of the epoch values, extracted by the substractor 115 output at $t = t_k$ is given by:

$$Z_k = Z_k^+ + Z_k - 1 \quad (3)$$

Using the trigonometric identity:

$$\cos A + \cos B = 2\cos[(A-B)/2]\cos[(A+B)/2] \quad (4)$$

results in equation (3) becoming:

$$Z_k + = |Z_k+)\cos 2\pi(f+f_d)tk + B \quad (5)$$

where $$|Z_k+| = 2\cos(\theta_k - \theta_k - 1)/2 + \pi fT + \pi f_d T \quad (6)$$

and $$B = (\theta_k + \theta_k - 1)/2 + b - 2\pi(f+f_d)T \quad (7)$$

Because of the subsequent envelope detection, the resulting IF carrier phase B is irrelevant. Hence, the focus is on the linear detection magnitude $|Z_k+|$.

For convenience, assume the IF and the sampling interval have been chosen so that $\pi ft = 0$ (modulo $2\pi$). Also assume $f_d = 0$. Equation (6) then simplifies into $$|Z_k^+| = 2\cos(\theta_k - \theta_{k-1})/2 \quad (8)$$

$$= M_k + 1 \quad (9)$$

with equation (9) following from equation (8) via the encoding relationship shown in FIGS. 4–5. Thus, the analog reconstitution of the sequence of magnitudes $\{|Z_k+|\}$ will consist of the desired audio, m(t), which can be envelope detected, plus an irrelevant dc term. The phasor diagram description of the relationships among $Z_k$, $Z_k - 1$ and $|Z_k+|$ is shown in FIG. 9B wherein, for simplicity, b as well as $f_d$ is assumed to be zero.

The IF and sampling interval may also be chosen so that $\pi ft = \pi$ (modulo $2\pi$). As a consequence, the right side of equation (6) becomes (for $f_d = 0$)

$$2\cos[(\theta_k - \theta_{k-1})/2 + \pi] = -2\cos(\theta_k - \theta_{k-1})/2 \quad (10)$$

However, the minus sign is irrelevant in the magnitude detection process. Hence, equation (8) remains valid.

One aspect of the invention that distinguishes the demodulation of differential phase encoding from that of other AM equivalents relates to the presence of the delay circuit 114 and the substract circuit 115 between the receiver 111 and the subsequent audio processing. The transfer characteristics of this circuit filters and thereby reduces the audio masking noise experienced by the other AM-equivalents.

Figure 6:
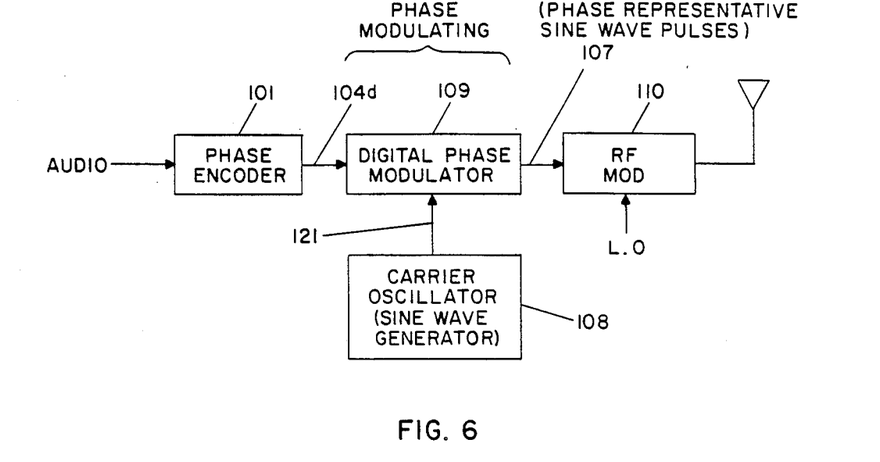
FIG. 6 illustrates a transmitter employing phase modulation according to the invention.
Figure 8:
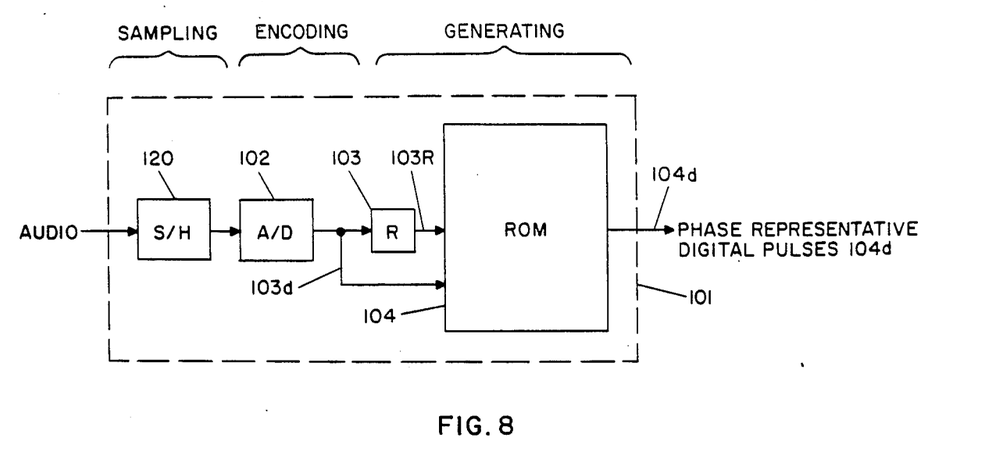
FIG. 8 illustrates a phase encoder used in the transmitter shown in FIG. 6.
Figure 10:
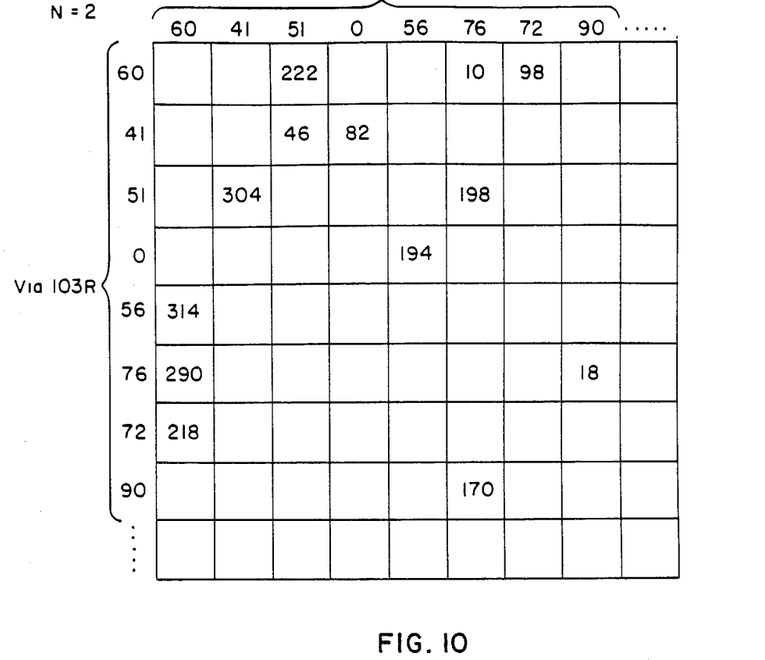
FIG. 10 illustrates the ROM look-up table for extended differential phase modulation.

FIG. 6 illustrates a transmitter employing the differential phase encoding signal format according to the invention. Audio information is provided to phase encoder 101 which may have a structure as illustrated in FIG. 8. The audio information is converted to sampled data information by sample and hold (S/H) circuit 120 and analog-to-digital converter 102 which provides the corresponding digital data pulses via line 103a to register 103 and Read Only Memory (ROM) 104. ROM 104 includes a look-up table 104 (such as shown in FIG. 10) which converts the amplitude of the corresponding digital information into phase representative digital information into phase representative digital information 104d as described above. This phase information 104d is modulated by phase modulator 109 into sine wave pulses of equal amplitude provided by sine wave (pulse) generator 108 to provide phase modulated sine wave pulses via line 107 which have a phase which corresponds to the amplitude of the sampled audio signal. These phase modulated pulses are then mixed by RF modulator 110 with a Local oscillation (L.O.) for transmission.

ROM 104 is programmed with a look-up table for converting the digital information provided by register 103 and line 103d as an address into phase representative digital pulses via line 104d. In particular, ROM 104 would be programmed with a table corresponding to FIG. 5 in the case of differential phase encoding. ROM 104 would be programmed with a table corresponding to FIG. 5 in the case of extended differential phase encoding.

For example, for extended differential phase encoding where N=2, serial register 103 would hold two bytes or samples of information. During each T seconds of time, ROM 104 would receive address information via line 103d and line 103R. Line 103d would provide a digital byte corresponding to the audio sample. Line 103R would provide a digital byte corresponding to the second previous audio sample. Referring to pulses 30 and 32 of FIG. 3 and pulse 72 of FIG. 5, if ROM 104 received an address corresponding to 60° (pulse 30) via line 103R and 51° (pulse 32) via line 103d, line 104d would read 222° (pulse 72). FIG. 10 is a diagram of the look-up table corresponding to FIG. 5.

Figure 11:
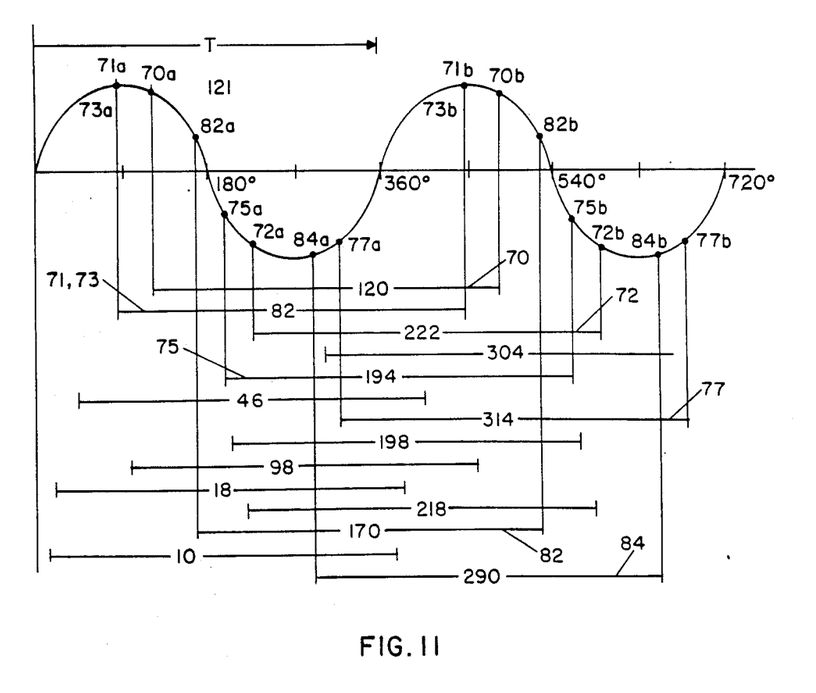
FIG. 11 illustrates in large scale the phase modulated pulses represented in the lower portion of FIG. 3.

The resulting phase representative sine wave pulses provided by line 107 are shown by FIG. 11. Sine wave generator 108 provides carrier oscillator 121 to digital phase modulator 109. Modulator 109 is a standard digital phase modulator well known in the prior art. Alternatively, phase representative digital pulses 104d may be converted to analog signals by a D/A converter and a standard analog phase modulator as disclosed in U.S. Pat. No. 3,492,576 may be used. Essentially, output 107 of modulator 109 provides a series of discrete sine waves each having a phase corresponding to the phase representative digital pulses 104d. For example, as shown in FIG. 11, the waveform provided by output 107 corresponding to FIG. 5 would be a series of sine wave pulses as follows: a sine wave pulse beginning at 70a and ending at 70b (pulse 70, phase 120°); followed by a sine wave pulse beginning at 71a and ending at 71b (pulse 71; phase 82°); followed by a pulse from 72a to 72b (pulse 72, phase 222°); followed by a pulse from 73a to 73b . . . ; followed by a pulse from 75a to 75b . . . ; followed by a pulse from 77a to 77b . . . ; followed by a pulse from 82a to 82b . . . ; and ending with a sine wave pulse beginning at 84a and ending at 84b (pulse 84, phase 290°).

FIG. 7 illustrates an apparatus for detecting a differential phase modulated signal according to the invention. The transmitted signal is received by receiver 111, mixed with the LO and provided to bandpass filter 112 to provide via line 113 the phase representative sine wave pulses. For differential phase demodulation, the pulses are delayed by delay 114 an amount of time equal to T (i.e. N=1). The delayed pulses are subtracted from the undelayed pulses provided via line 113a by subtractor 115. This results in line the output of substractor 115 providing a carrier signal amplitude modulated with (i.e., corresponding to) phase difference $\theta_n - \theta_{n-1}$. As discussed above, for differential phase encoding, the amplitude of the audio information at time $t_n$ is defined by $$M_n = m(t_n) + 1 = 2 \cos [(\theta_n - \theta_{n-1})/2] \tag{a}$$

Therefore, the amplitude $M_n$ may be linearly detected by envelope detector 116 such as a diode. The detected amplitude is then fed through low-pass filter 117 resulting in the audio information.

Similarly, for extended differential phase modulation the pulses provided via line 113 may be delayed by an amount of time equal to NT. For extended differential phase modulation wherein the reference is the second preceding pulse, N is equal to 2; for such modulation wherein the reference is the jth proceding pulse, N is equal to j. For N=2, this results in line 116 providing a signal amplitude modulated with (i.e., corresponding to) phase difference $\theta_n - \theta_{n-2}$. As discussed above, for extended differential phase encoding, the amplitude of the audio information at time $t_n$ is defined by $$m_n = m(t_n) + 1 = 2 \cos [(\theta_n - \theta_{n-2})/2] \tag{b}$$

Therefore, the amplitude $M_n$ may be linearly detected by envelope detector 116.

FIG. 9B depicts the demodulation process for differential phase encoding. The magnitude of the receiver output 113 are unaffected by the fixed carrier phase shift over each sample interval. Output 113 represents the series of pulses provided by ROM output 104d.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claim is:

1. A method of modulating a carrier wave with an analog signal comprising the steps of:
   sampling the amplitude of the analog signal every T seconds to provide sampled amplitudes corresponding to the amplitude of the analog signal every T seconds;

encoding in sequential order the sampled amplitudes into digital data pulses of pulse rate 1/T, each said digital data pulse having an amplitude corresponding to the amplitude of each sampled pulse;

generating phase representative digital pulse corresponding to the difference between the amplitude of each said digital data pulse and the amplitude of the digital data pulse previous to and contiguous with each said digital data pulse;

phase modulating the phase representative digital pulses onto a sine wave thereby generating phase representative sine wave pulses which correspond to the analog signal; and mixing said phase representative sine wave pulses with the carrier wave.

2. The method of claim 1 wherein the step of encoding comprises the steps of:

converting the sampled amplitudes into a corresponding digital signal;

applying the digital signal to a read-only memory to generate corresponding phase representative digital pulses; and wherein the step of phase modulating comprises the step of providing phase representative sine wave pulses of equal amplitude and of pulse rate 1/T, each successive phase representative sine wave pulse having a phase corresponding to each successive phase representative digital pulse.

3. A method of demodulating a carrier wave which is modulated with phase representative sine wave pulses of pulse rate 1/T, having a phase corresponding to the difference between the amplitude of one digital data pulse of a sequence of digital data pulses and the amplitude of a digital data pulse in the sequence which is previous to and contiguous with the one digital data pulse, said sequence corresponding to an analog signal to be detected, said method comprising the steps of:

delaying the carrier wave for T seconds;

developing a carrier wave difference signal having a phase which represents the difference between the delayed carrier wave and the undelayed carrier wave; and detecting the envelope of said difference signal.

4. The method of claim 3 wherein said step of detecting comprises applying said difference signal to an envelope detector.

5. An apparatus for modulating a carrier wave with an analog signal comprising:

(a) means for providing the signal;

(b) means for sampling the amplitude of the signal every T seconds to provide sampled amplitudes corresponding to the amplitude of the analog signal every T seconds;

(c) means for encoding in sequential order the sampled amplitudes into digital data pulses of pulse rate 1/T, each said digital data pulse having an amplitude corresponding to the amplitude of each sampled pulse;

(d) means for generating phase representative digital pulses corresponding to the difference between the amplitude of each said digital data pulse and the amplitude of the digital data pulse previous to and contiguous with each said digital data pulse; and (e) means for phase modulating the phase representative digital pulses onto a sine wave thereby generating phase representative sine wave pulses which correspond to the analog signal; and (f) means for mixing said phase representative sine wave pulses with the carrier wave.

6. The apparatus of claim 5 wherein said means for encoding comprises:

an analog to digital converter for converting the sampled amplitudes into corresponding digital data pulses;

a read-only memory (ROM) including a look-up table for defining the difference between two amplitudes applied as an address;

means for applying the digital signals as an address to the ROM for generating corresponding phase representative digital pulses at the output of the ROM; and wherein said means for phase modulating comprises means for providing phase representative sine wave pulses of equal amplitude and of pulse rate 1/T, each successive phase representative sine wave pulse having a phase corresponding to each successive phase representative digital pulse.

7. An apparatus for demodulating a carrier wave which is modulated with phase representative sine wave pulses of pulse rate 1/T, having a phase corresponding to the difference between the amplitude of one digital data pulse of a sequence of digital data pulses and the amplitude of a digital data pulse in the sequence which is previous to and contiguous with the one digital data pulse, said sequence corresponding to an analog signal to be detected, said apparatus comprising:

(a) means for delaying the carrier wave for T seconds;

(b) means for developing a carrier wave difference signal having a phase which represents the difference between the delayed carrier wave and the undelayed carrier wave; and (c) means for detecting the envelope of said difference signal.

8. The apparatus of claim 7 wherein said means for detecting comprises a diode.

9. A system for transmitting audio information comprising a transmitter comprising;

(a) means for providing the signal;

(b) means for sampling the amplitude of the signal every T seconds;

(c) means for encoding in sequential order the sampled amplitudes into digital data pulses of pulse rate 1/T, each said digital data pulse having an amplitude corresponding to the amplitude of each sampled pulse;

(d) means for generating phase representative digital pulses corresponding to the difference between the amplitude of each said digital data pulse and the amplitude of the digital data pulse previous to and contiguous with each said data pulse;

(e) means for phase modulating the phase representative digital pulses onto a sine wave thereby generating phase representative sine wave pulses which correspond to the analog signal;

(f) means for mixing said phase representative sine wave pulses with the carrier wave; and a receiver comprising:

(g) means for delaying the carrier wave for T seconds;

(h) means for developing a carrier wave difference signal having a phase which represents the difference between the delayed carrier wave and the undelayed carrier wave; and (i) means for detecting the envelope of said difference signal.

10. The system of claim 9 wherein said means for encoding comprises:

an analog to digital converter for converting the sampled amplitudes into corresponding digital signals;

a read-only memory (ROM) including a look-up table for defining the difference between two amplitudes applied as an address;

means for applying the digital signals as an address to the ROM for generating corresponding phase representative digital pulses at the output of the ROM;

wherein said means for phase modulating comprises means for providing phase representative sine wave pulses of equal amplitude and of pulse rate 1/T, each successive phase representative sine wave pulse having a phase corresponding to each successive phase representative digital pulse; and wherein said means for detecting comprises a diode.

11. A method of modulating a carrier with an analog signal comprising the steps of:

sampling the amplitude of the analog signal every T seconds to provide sampled amplitudes corresponding to the amplitude of the analog signal every T seconds;

encoding in sequential order the sampled amplitudes into digital data pulses of pulse rate 1/T, each said digital data pulse having an amplitude corresponding to the amplitude of each sampled pulse;

generating phase representative digital pulses corresponding to the difference between the amplitude of each said digital data pulse and the amplitude of the digital data pulse Nth preceding each said digital data pulse where N is an integer greater than 1;

phase modulating the phase representative digital pulses onto a sine wave thereby generating phase representative sine wave pulse which correspond to the analog signal; and mixing said phase representative sine wave pulses with the carrier wave.

12. The method of claim 11 wherein the step of encoding comprises the steps of:

converting the sampled amplitudes into a corresponding digital signal;

applying the digital signals to a read-only memory to generate corresponding phase representative digital pulses; and wherein the step of phase modulating comprises the step of providing phase representative sine wave pulses of equal amplitude and of pulse rate 1/T, each successive phase representative sine wave pulse having a phase corresponding to each successive phase representative digital pulse.

13. A method of demodulating a carrier wave which is modulated with phase representative sine wave pulses of pulse rate 1/T, having a phase corresponding to the difference between the amplitude of one digital data pulse of a sequence of digital data pulses and the amplitude of a digital data pulse in the sequence which is Nth preceding to the one digital data pulse where N is an integer greater than 1, said sequence corresponding to an analog signal to be detected said method comprising the steps of:

delaying the carrier wave for NT seconds;

developing a carrier wave difference signal having a phase which represents the difference between the delayed carrier wave and the undelayed carrier wave; and detecting the envelope of said difference signal.

14. The method of claim 13 wherein said step of detecting comprises applying said difference signal to an envelope detector.

15. An apparatus for modulating a carrier wave with an analog signal comprising:

(a) means for providing the signal;

(b) means for sampling the amplitude of the signal every T seconds to provide sampled amplitudes corresponding to the amplitude of the analog signal every T seconds;

(c) means for encoding in sequential order the sampled amplitudes into digital data pulses of pulse rate 1/T, each said digital data pulse having an amplitude corresponding to the amplitude of each sampled pulse;

(d) means for generating phase representative digital pulses corresponding to the difference between the amplitude of each said digital pulse and the amplitude of the digital data pulse Nth preceding each said digital data pulse where N is an integer greater than 1;

(e) means for phase modulating the phase representative digital pulses onto a sine wave thereby generating phase representative sine wave pulses which correspond to the analog signal; and (f) means for mixing said phase representative sine wave pulses with the carrier wave.

16. The apparatus of claim 15 wherein said means for encoding comprises:

an analog to digital converter for converting the sampled amplitude into corresponding digital signals;

a read-only memory (ROM) including a look-up table for defining the difference between two amplitudes applied as an address;

means for applying the digital signal as an address to the ROM for generating corresponding phase representative digital pulses at the output of the ROM; and wherein said means for phase modulating comprises means for providing phase representative sine wave pulses of equal amplitude and of pulse rate 1/T, each successive phase representative sine wave pulse having a phase corresponding to each successive phase representative digital pulse.

17. An apparatus for demodulating a carrier wave which is modulated with phase representative sine wave pulses of pulse rate 1/T, having a phase corresponding to the difference between the amplitude of one digital data pulse of a sequence of digital data pulses and the amplitude of a digital data pulse in the sequence which is Nth preceding to the one digital data pulse where N is an integer greater than 1, said sequence corresponding to an analog signal to be detected, said apparatus comprising:

(a) means for delaying the carrier wave for NT seconds;

(b) means for developing a carrier wave difference signal having a phase which represents the difference between the delayed carrier wave and the undelayed carrier wave; and (c) means for detecting the envelope of said difference signal representing the difference.

18. The apparatus of claim 17 wherein said means for detecting comprises a diode.

19. A system for transmitting audio information comprising a transmitter comprising:
 (a) means for providing the signal;
 (b) means for sampling the amplitude of the signal every T seconds;
 (c) means for encoding in sequential order the sampled amplitudes into digital data pulses of pulse rate 1/T, each said digital data pulse having an amplitude corresponding to the amplitude of each sampled pulse;
 (d) means for generating phase representative digital pulses corresponding to the difference between the amplitude of each said digital pulse and the amplitude of the digital data pulse Nth preceding each said digital data pulse where N is an integer greater than 1;
 (e) means for phase modulating the phase representative digital pulses onto a sine wave thereby generating phase representative sine wave pulses which correspond to the analog signal; and
 (f) means for mixing said phase representative sine wave pulses with the carrier wave; and a receiver comprising:
 (g) means for delaying the carrier wave for NT seconds:
 (h) means for developing a difference signal which represents the difference between the delayed carrier wave and the undelayed carrier wave; and
 (i) means for detecting the envelope of said difference signal.

20. The apparatus of claim 19 wherein said means for encoding comprises:
 an analog to digital converter for converting the sampled amplitudes into corresponding digital signals;
 a read-only memory (ROM) including a look-up table for defining the difference between two amplitudes applied as an address;
 means for applying the digital signals as an address to the ROM for generating corresponding phase representative digital pulses at the output of the ROM;
 wherein said means for phases modulating comprises means for providing phase representative sine wave pulses of equal amplitude and of pulse rate 1/T, each successive phase representative sine wave pulse having a phase corresponding to each successive phase representative digital pulse; and
 wherein said means for detecting comprises a diode.

21. The system of claim 20 wherein N=2.

* * * * *